United States Patent [19] | [11] Patent Number: 4,903,304

Schlang et al. | [45] Date of Patent: Feb. 20, 1990

[54] METHOD AND APPARATUS FOR THE RECOGNITION OF INDIVIDUALLY SPOKEN WORDS

[75] Inventors: Martin Schlang; Wolfgang Kuepper; Bernhard Kaemmerer, all of Munich, Fed. Rep. of Germany

[73] Assignee: Siemens Aktiengesellschaft, Berlin and Munich, Fed. Rep. of Germany

[21] Appl. No.: 262,183

[22] Filed: Oct. 20, 1988

Related U.S. Application Data

[63] Continuation of Ser. No. 853,945, Apr. 21, 1986, abandoned.

[30] Foreign Application Priority Data

Apr. 19, 1986 [DE] Fed. Rep. of Germany ....... 3514286

[51] Int. Cl.[4] .......................... G10L 1/00; G10L 5/00; G10L 3/00

[52] U.S. Cl. ....................................................... 381/41

[58] Field of Search .................................... 381/41–43; 364/513.5

[56] References Cited

U.S. PATENT DOCUMENTS

| | | | |
|---|---|---|---|
| 3,541,259 | 11/1970 | Gilmour | 381/43 |
| 4,038,503 | 7/1977 | Moshier | 381/43 |
| 4,516,215 | 5/1985 | Hakaridani et al. | 381/43 |
| 4,531,228 | 7/1985 | Noso et al. | 381/46 |
| 4,558,459 | 12/1985 | Noso et al. | 381/43 |
| 4,592,085 | 5/1986 | Watari et al. | 381/43 |
| 4,715,065 | 12/1987 | Parker | 381/46 |
| 4,718,097 | 1/1988 | Uenoyama | 381/46 |

*Primary Examiner*—Gary V. Harkcom
*Assistant Examiner*—Christopher H. Lynt
*Attorney, Agent, or Firm*—Hill, Van Santen, Steadman & Simpson

[57] ABSTRACT

A system for recognizing individually spoken words includes an acousto-electric transducer with a controllable amplifier and a high-pass filter connected to a level calculation path for calculating the level of the output signal by detecting the signal envelope and converting the envelope signal to a 1-bit digital signal to be supplied to a microprocessor. A signal analysis path is also connected to the transducer and includes a low-pass filter followed by a 1-bit analog to digital converter and a digital processing unit which supplies data units to the microprocessor. Individually spoken words are recognized and actions taken accordingly.

20 Claims, 3 Drawing Sheets

DIGITAL PROCESSING UNIT
VV
8 Bit SHIFT REGISTER
VE
≥1
G1
GN
8 Bit
µP
MEMORY
LEXICON MEANS
8
PORT
1
INTERRUPT
1
PORT
CL
CLOCK
TS
SAMPLER
ASP
KP
WP
LEVEL INDICATOR
I
INTEGRATOR
COMPARATOR
IP
RECTIFIER
DP
WS
KS
ASS
COMPARATOR
SAMPLER
TP
LOW PASS FILTER
S
P
HP
HIGH PASS FILTER
CONTROLLABLE LIMITER PRE-AMP
WE
ACOUSTO-ELECTRIC TRANSDUCER

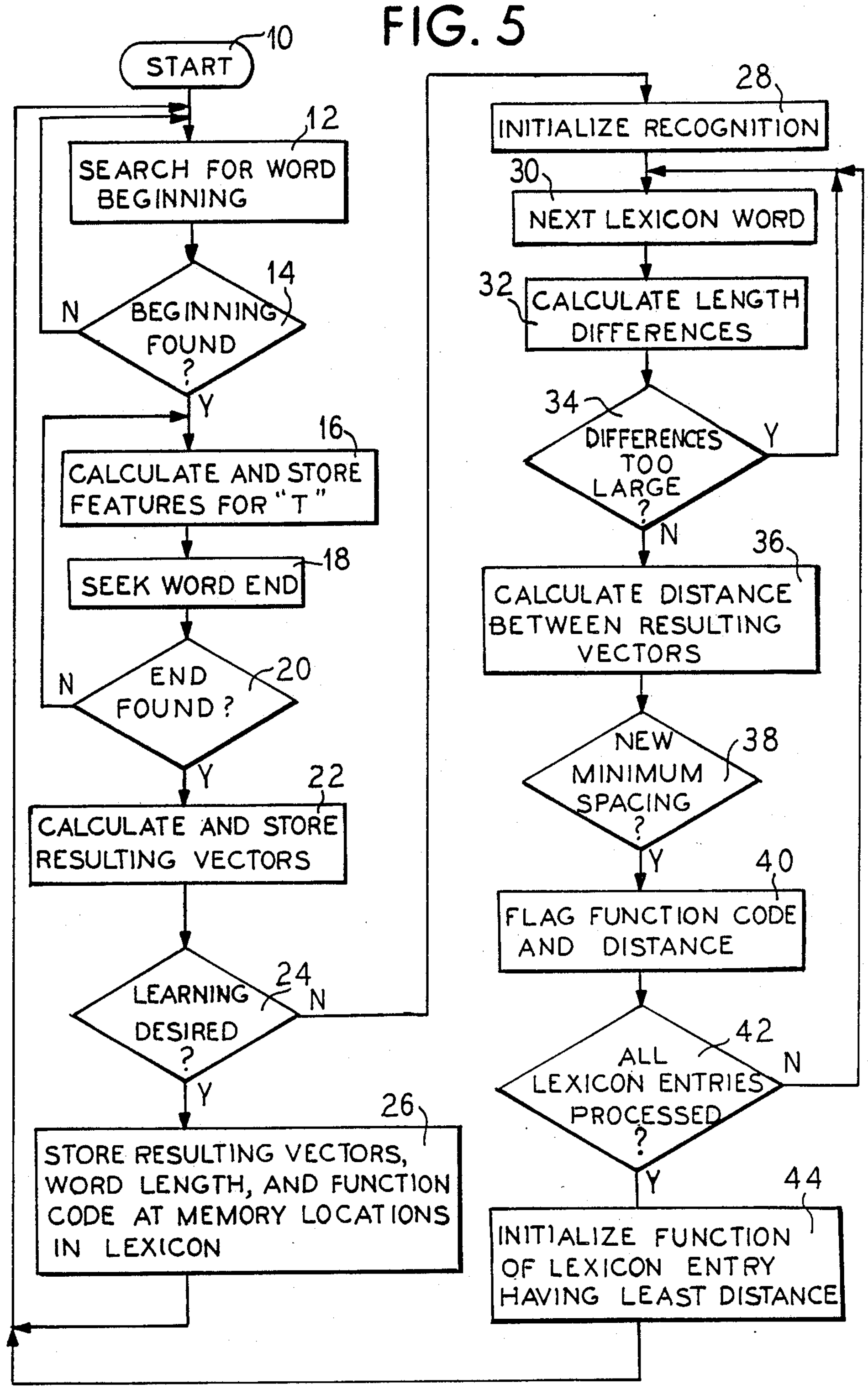
FIG. 5
START
10
SEARCH FOR WORD BEGINNING
12
BEGINNING FOUND ?
14
N
Y
CALCULATE AND STORE FEATURES FOR "T"
16
SEEK WORD END
18
END FOUND ?
20
CALCULATE AND STORE RESULTING VECTORS
22
LEARNING DESIRED ?
24
STORE RESULTING VECTORS, WORD LENGTH, AND FUNCTION CODE AT MEMORY LOCATIONS IN LEXICON
26
INITIALIZE RECOGNITION
28
NEXT LEXICON WORD
30
CALCULATE LENGTH DIFFERENCES
32
DIFFERENCES TOO LARGE ?
34
CALCULATE DISTANCE BETWEEN RESULTING VECTORS
36
NEW MINIMUM SPACING ?
38
FLAG FUNCTION CODE AND DISTANCE
40
ALL LEXICON ENTRIES PROCESSED ?
42
INITIALIZE FUNCTION OF LEXICON ENTRY HAVING LEAST DISTANCE
44

METHOD AND APPARATUS FOR THE RECOGNITION OF INDIVIDUALLY SPOKEN WORDS

This is a continuation of application Ser. No. 853,945, filed Apr. 21, 1986, now abandoned.

BACKGROUND OF THE INVENTION

1. Field of the Invention:

The present invention relates generally to a system for recognizing individually spoken words and, more particularly, to a word recognition system for small-size vocabularies.

2. Description of the Prior Art:

There has long been a desire to be able to input instructions and commands into a system without requiring manual operations. This has been achieved by numerous known speech recognition systems. However, the know speech recognition systems generally require relatively great expenditures for both hardware and software in order to recognize spoken instructions.

SUMMARY OF THE INVENTION

An object of the present invention is to provide a system for recognizing individually spoken words that has a small vocabulary and, in comparison to known systems, can be provided both a compact manner and relatively inexpensively by using standard components. This and other objects of the present invention are embodied in an apparatus and method in which a spoken word is measured for its time duration and translated into vector sequence which are recorded in a lexicon, or dictionary, with a corresponding command code. Recognition of individually spoken words subsequently occurs by comparing the length and vector sequence calculated from the newly spoken words to those recorded in the lexicon.

An apparatus is provided having an acousto-electric transducer, or microphone, connected to supply a signal to each of a signal analysis path and a level calculation path. In the signal analysis path, the transducer signal is filtered, converted into a digital signal, and processed by a digital processing unit for partial operational sign correlation into a data word that is supplied to a microprocessor. In the level calculation path, the envelope of the transducer signal is generated and converted to a digital signal, which is supplied to the microprocessor.

Additional embodiments of the present system provide that a plurality of expressions for every word to be recognized are processed and deposited in the lexicon so that various expressions of the word can be recognized. The present device provides an economical, compact apparatus for recognizing individually spoken words and thereby initiating functions or actions. The present apparatus can be realized without special modules and requires only simple time-saving software.

It is contemplated to use the apparatus of the present invention in such applications as: accoustic call number selection via a telephone, handset free telephone terminal equipment, providing operating instructions to a motor vehicle, and manipulation of medical devices.

BRIEF DESCRIPTION OF THE DRAWINGS

FIG. 5 is a flow chart showing an embodiment of a procedural execution, or method, of the present invention.

Figure 1:
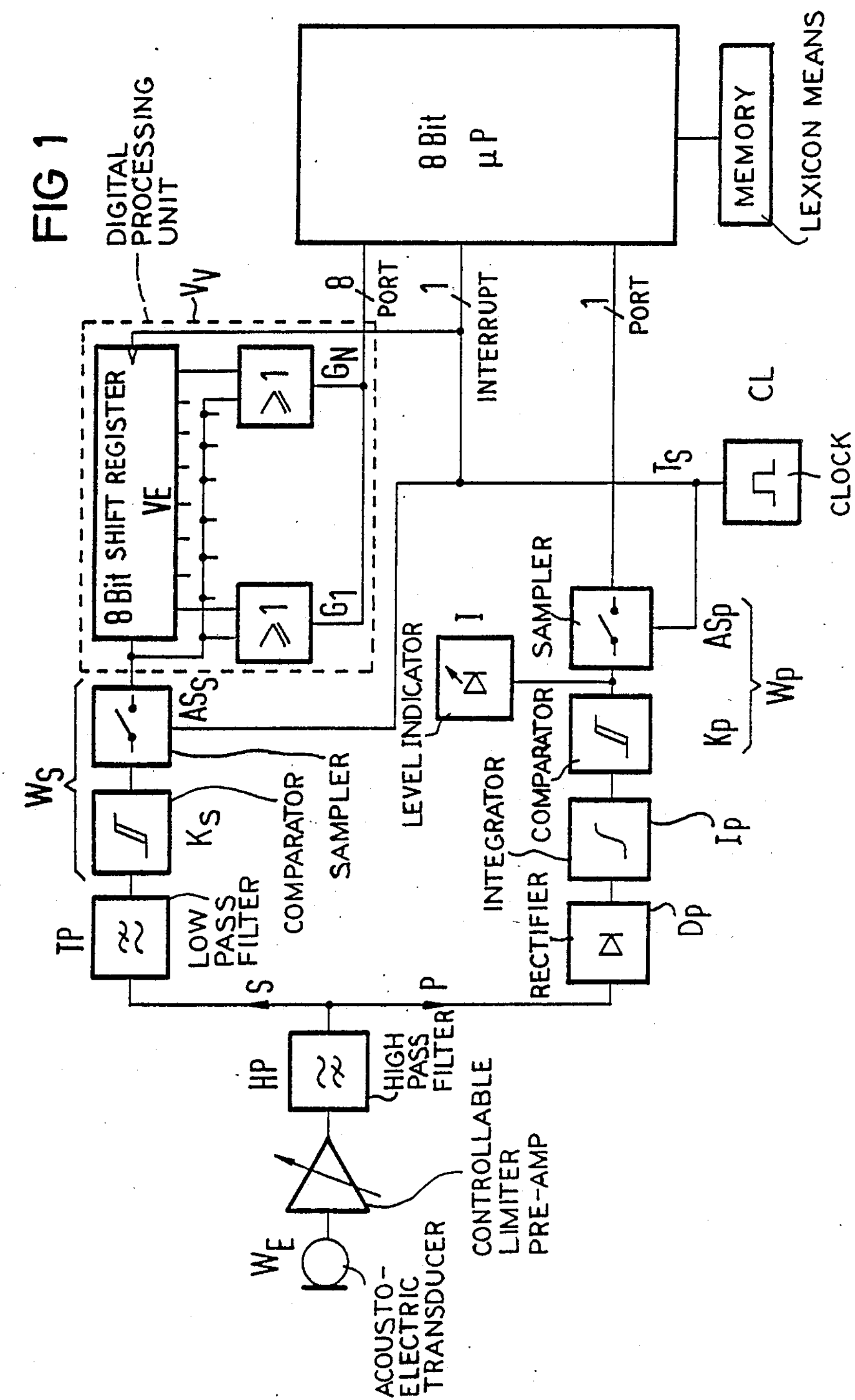
FIG. 1 is a block diagram of an apparatus embodying the structural principals of the present invention and capable of practicing the steps of the contemplated method.

DESCRIPTION OF THE PREFERRED EMBODIMENTS:

A recognition circuit is shown in FIG. 1, including an acousto-electric transducer, or microphone, $W_E$ connected to a variable amplitude controllable amplifier $V_R$, the output of which is connected to a high-pass filter HP. The transducer $W_E$ receives accoustic information which is amplified by the controllable amplifier $V_R$ and filtered by the high-pass filter HP. The resulting signal is fed to two paths, the first of which is a signal analysis path S. The signal analysis path S includes a low-pass filter TP, the output of which is fed to a 1-bit analog to digital (A/D) converter unit $W_S$ which converts the signal into digital information. The digital information signal from the A/D converter $W_S$ is fed to a digital processing unit $V_V$ for partial operational sign correlation. The output signal of the digital processing unit $V_V$ appears as a parallel data word which is a plurality of bits wide. The data word is supplied to a digital input of a microprocessor $\mu$P.

The second signal path is a level calculation path P. The level calculation path P calculates the level of the output signal from the transducer unit $W_E$ in a first approximation by obtaining the envelope of the transducer output signal. The envelope is generated by a rectifier $D_P$ followed by an integrator $I_P$. The output of the integrator $I_P$, which is an envelope of the transducer signal, is fed to a 1-bit A/D converter unit $W_P$. The digital 1-bit output signal of the A/D converter $W_P$ is supplied to a second digital input of the microprocessor $\mu$P.

To synchronize the individual converter units $W_P$ and $W_S$ with the microprocessor $\mu$P, a high order clock signal $T_S$ is generated by a clock generater CL.

The 1-bit A/D converter unit $W_S$ is composed of a comparator $K_S$ and a scanner switch, or sampler, $AS_S$ connected to the output of the comparator $K_S$. Likewise, the 1-bit A/D converter $W_P$ includes a comparator $K_P$ followed by a scanner switch, or sampler, $AS_P$. The scanner switches $AS_P$ and $AS_S$ are preferably each a clocked flip-flop.

The digital processing unit $V_V$ includes a clocked, digital delay unit VE having a plurality of outputs to each of which is connected a logic module $G_1$–$G_N$. The digital delay unit VE is preferably a shift register, although other circuit elements may be used as well. The logic modules $G_1$–$G_N$, in a preferred embodiment, are exclusive - OR elements, although they can also be coincidence elements, such as AND logic gates.

All of the digital components are preferably realized in a common logic unit, such as a programmable logic array (PLA).

It is within the scope of the present invention to include the digital processing unit $V_V$ as part of the microprocessor $\mu P$ by correspondingly increasing the calculating performance of the microprocessor.

The illustrated embodiment includes a level indicator I which allows a check of the manual setting of the gain factor of the amplifier $V_R$. The level indicator I is shown as a light emitting diode LED connected to the output of the comparator $K_P$ in the level calculating path P. Instead of the LED level indicator I, an analog display unit (not shown) may prove more useful for some cases. The analog display unit, when used, is connected at the output of the A/D converter unit $W_P$.

The amplifier $V_R$ can be set automatically, depending on the existing surrounding field noise, by means of a surrounding field noise acquisition device (not shown). For setting the amplifier $V_R$, an actuating variable is generated from the transducer output signal by a low-pass filter having a relatively great time constant (not shown). Alternately, the device can include a second acousto-electric transducer (not shown) functioning as an auxiliary transducer. The auxiliary transducer output is fed to a low-pass filter with a low time constant so as to generate an actuating variable for setting the gain of the amplifier $V_R$.

Figure 2:
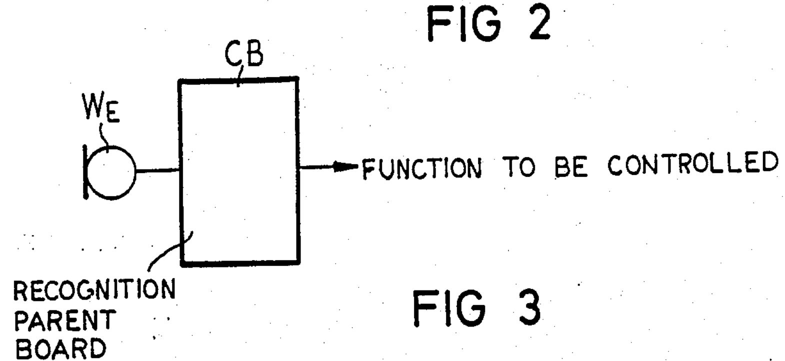
FIG. 2 is a schematic illustration of the interconnectins of an acousto-electric transducer and a recognition circuit motherboard containing the system of the present invention.

In FIG. 2, the transducer $W_E$ is connected to a circuit board, or motherboard, CB. The single circuit board CB includes the entire system shown in FIG. 1, with the exception, of course, of the transducer $W_E$. The output signals of the circuit board CB are used to control actions and functions corresponding to recognized individually spoken words. The present system can, thus, be used in a stand-alone mode.

Figure 3:
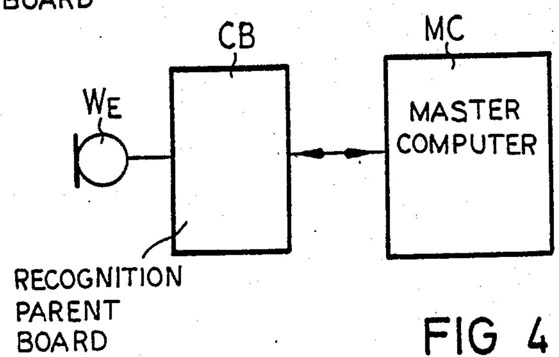
FIG. 3 is a schematic illustration of an acousto-electric transducer connected to a recognition circuit motherboard containing the system of the present invention which is connected to a master computer.

The circuit board, or motherboard, CB and acousto-electric transducer $W_E$ is shown as well in FIG. 3. The output of the circuit board CB is connected to a master computer MC. The master computer MC interprets the output signals from the circuit board CB to perform higher-order jobs. The present system is, thus, connected as a front-end system for the master computer MC.

Figure 4:
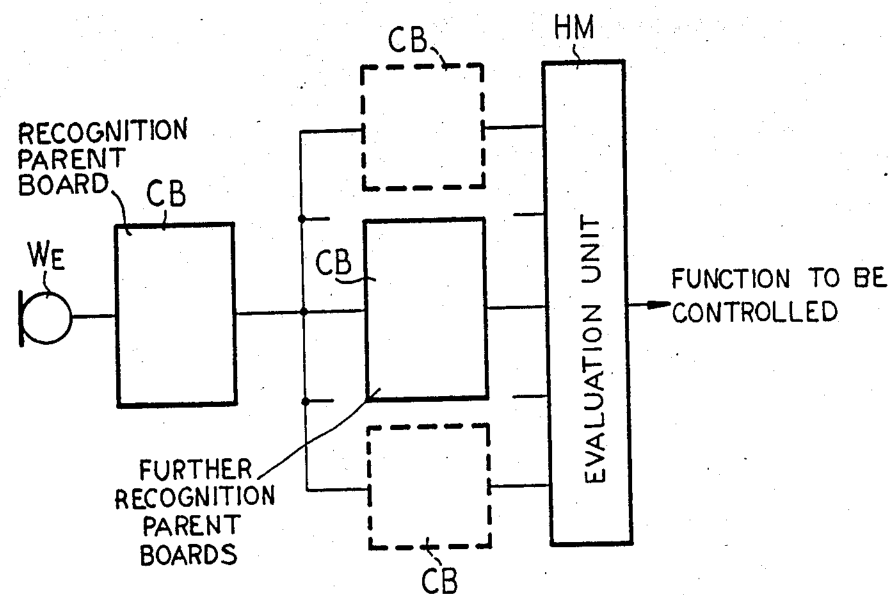
FIG. 4 is a schematic illustration showing a plurality of devices of FIG. 2 interconnected with a higher order recognition motherboard to provide an expanded vocabulary.

Referring to FIG. 4, a plurality of the present systems are interconnected, each recognition circuit board CB can process a sub-vocabulary and additional circuit boards CB can be added, as shown in dotted outline, to meet the demands for additional vocabulary. Each circuit board CB motherboard HM having an expanded vocabulary.

In one embodiment of the present system, Texas Instruments 084 BIFET op amp is used, as is a National Semiconductor LM 339 quad comparator, Texas Instruments 74 LS 164 shift register, Texas Instruments 74 LS 109 flip-flop and Texas Instruments 74 LS 86 exclusive -OR gate. The microprocessor is an Intel 8085 with 2k×8 bit RAM, 2k×8 bit RAM (C-MOS battery buffered), and a Parallel-Port SAB 8251 USART (Universal Synchronous/Asynchronous Receiver/Transmitter).

In accordance with the present invention, a method is provided for operating a speech recognition system. One embodiment of the method is shown in the flow chart of FIG. 5. First the beginning of the word is found at 12 and 14. For the purpose of a feature calculation at 16, an operational sign correlating with a vector AKF is executed. The vector AKF is composed of vector components AKF(n) and is executed according to the following function:

$$AKF(n) = \sum_{t=0}^{T} s(t) \times s(t+n)$$

wherein s(t) is the output signal of the 1-bit A/D converter $W_S$ and t indicates the scan times of the scanner switch $AS_S$, for t=0,1,2,3, . . . T. T is the length of the time interval to be observed and n=1,2,3 . . . N, where $n \leqq T$ represents the shift parameter of the correlation.

The present method further provides that full, individually spoken words be represented by a sequence of operational sign correlation vectors AKF. The vectors AKF are the features of successive time intervals of the length T within the word. Thus, the present method provides that the output of the 1-bit A/D converter $W_P$ be taken into consideration at times $t_p = mxT$, for m=0,1,2 . . .. The signal produced thereby is referred to as a level signal.

The beginning of individually spoken words is sensed at 12 when, at time $t_{PA}$, the level signal has a value of logic "1" and subsequently is at a logic level "1" more frequently than it is at a logic level "0" within a predetermined time span. The end of the individually spoken words is sensed at 18 at a time $t_{PE}$ when a last level signal having a value of logic "1" is followed by a predetermined number of level signals having a value of logic "0". The length L of an individually spoken word is determined from the difference between the end time and the beginning time of the word, such as $L = t_{PE} - t_{PA}$.

The subject method provides that the word is divided into $N_B$ number of regions B(1) . . . B($N_B$), where $N_B$ is preferrably odd. Each of the regions B(1) . . . B($N_B$) has the same number of feature vectors, the number of feature vectors within one of the regions B(1) . . . B($N_B$) is $2/N_B+1$ of the number of feature vectors over the length L. The beginning of each othe regions B(1) . . . B($N_B$) lies at a distance from the beginning of the word by the following values:

$$0 \times \frac{1}{N_B+1}, 1 \times \frac{1}{N_B+1}, 2 \times \frac{1}{N_B+1} \ldots N_B - 1 \times \frac{1}{N_B+1}$$

Furthermore, the feature vectors within the region B(1) . . . B($N_B$) are averaged to provide resulting vectors R1 . . . $RN_B$ at 22.

During what is referred to as the learning phase of the present system at 26, the resulting vectors R1 . . . $RN_B$, as well as the appertaining length L of a word and a suitable coding identifier, are deposited in a lexicon, or dictionary, for each word to be recognized in the recognition phase.

The recognition phase is initialized at 28 and begins by eliminating those words in the lexicon which have a length that is smaller by a factor of F1 or greater by a factor of F2 than the length of the word to be recognized at 30, 32 and 34. The respective components of the resulting vectors RN1 . . . $RN_B$ of the word to be recognized are then summed over the amount differences and a likewise summation over the amount differences of the resulting vector components of the respective lexicon word is determined at 36. The distance of the word to be recognized from the lexicon words is determined. The lexicon word having the least distance from the word to be recognized is selected as fitting at 40. If this least difference is greater than a prescribed value, the lexicon word is rejected. If this least distance is less than a prescribed value, then the coding selected as the identifier for the fitting or proper lexicon word is output to trigger a predetermined action at 44.

Another development of the present method provides that a plurality of "expressions" are processed and deposited in the lexicon for every word to be recognized. For each word to be recognized, an expression is selected from the plurality of expressions which has the least distance of the plurality of expressions from the word.

It is further provided by the present method that the lexicon word is "relearned" by considering the word length and the vectors R1 . . . $RN_B$ in case the least recognition distance falls below a prescribed value at 38.

Finally, it is provided that various "expressions" of a word to be recognized are deposited in the lexicon for various speakers, and even for various languages.

Thus, the described system and method enables an inexpensive and compact device to be realized which has a relatively small vocabulary and which can be controlled to recognize individually spoken words from this vocabulary and to initiate functions or actions therewith selected. The present system is particularly advantageous insofar as it does not require special modules. More specifically, the device can be provided exclusively using commercially available standard modules that require only simple, time-saving software.

As is apparent from the foregoing specification, the invention is susceptible to being embodied with various alterations and modifications which may differ particularly from those that we have described in the preceding specification and description. It should be understood that we wish to embody within the scope of the patent warranted hereon all such modifications as reasonably and properly come within the scope of our contribution to the art.

What is claimed is:

1. A system for the recognition of separately spoken words, comprising:
- an acousto-electric transducer for receiving the spoken words to be recognized and producing an electrical signal therefrom;
- a controllable amplifier connected to an output of said acousto-electric transducer to amplify the electrical signal from said transducer;
- a high-pass filter connected to an output of said controllable amplifier to filter the electrical signal;
- a signal analysis path connected at an output of said high-pass filter to receive the electrical signal, said signal analysis path including:
  - a low pass filter for filtering the electrical signal;
  - a first one-bit analog - to - digital converter connected at an output of said low pass filter for converting the electrical signal into a digital signal;
- a digital processing means for sign correlation of the signal in sections from said first analog-to-digital converter to produce digital data words;
- a microprocessor having a digital input connected to receive said digital data words from said digital processing means;
- a level calculation path connected to the output of said high pass filter, said level calculation path including:
  - an envelope detection circuit operable to calculate the level of the output signal of said transducer and produce an envelope signal;
  - a second one-bit analog-to-digital converter having an input connected to an output of said envelope detection circuit and having and output connected to a digital input of said microprocessor for producing a digital envelope signal from said envelope signal; and
- means for supplying a master clock signal to synchronize said microprocessor and said first and second analog-to-digital converters;
- said microprocessor processing signals from said first and second analog to-digital converters to recognize the spoken words, said microprocessor:
  - receiving the beginning and end of the digital envelope signal corresponding to a separately spoken word t determine the word length,
- dividing the signals corresponding to a separately spoken word into regions having feature vectors,
- averaging the feature vectors to produce resulting vectors, and
- comparing the resulting vectors to lexicon entries for election of an appropriate lexicon word.

2. A system as claimed in claim 1, wherein said first and second analog-to-digital converters each include:
- a comparator, and
- a sampler connected to an output of said comparator.

3. A system as claimed in claim 2, wherein said sampler includes a flip-flop connected to receive a clock signal.

4. A system as claimed in claim 1, wherein said digital processing means includes:
- a digital delay unit connected to receive a clock signal and having a plurality of outputs; and
- a plurality of logic modules connected to respective ones of said delay unit outputs.

5. A system as claimed in claim 4, wherein said digital delay unit includes a shift register 6. A system as claimed in claim 4, wherein said logic modules each include an exclusive-OR element.

7. A system as claimed in claim 4, wherein said logic modules are coincidence elements.

8. A system as claimed in claim 1, wherein at least said first and second analog-to-digital converters and said envelope detection circuit form a common logic unit.

9. A system as claimed in claim 8, wherein said common logic unit is a programmable logic array.

10. A system as claimed in claim 1, wherein said microprocessor includes said digital processing means.

11. A system as claimed in claim 1, wherein said controllable amplifier has a gain factor manually controllable to a manual setting, and further comprising:
- a level indicating means for checking the manual setting of the gain factor of said controllable amplifier.

12. A system as claimed in claim 11, wherein said level indicator includes a light-emitting diode connected to said second analog-to-digital converter in said level calculation path.

13. A system as claimed in claim 11, wherein said level indicator includes an analog display unit connected at an output of said second analog-to-digital converter.

14. A method for operating a separately spoken word recognition system having first and second converters, a scanner and a lexicon, comprising the steps of:

executing a sign correlation with a vector composed of vector components according to the function:

$$AKF(n) = \sum_{t=0}^{T} s(t) x s(t+n)$$

for feature calculation wherein AKF (n) are vector components, s(t) is the output signal of the first converter means, t is the scan time of the scanner-means, T is the length of the time interval to be observed and N+1, 2, 3 . . . N whereby $N \leqq T$ represents the shift parameter of a correlation;

representing a full separately spoken word by a sequence of sign correlation vectors, said vectors being features of successive time intervals of the length of the time interval to be observed within the word;

considering at time $tp = m \times T$ for m=1, 2, 3 . . . a level signal output of the second converter means;

perceiving the beginning of separately spoken words at the time $t_{PA}$ when said level signal has a logic level of "1" and subsequently assumes a logic level of "1" more frequently in a predetermined time span than a logic level of "0";

perceiving the end of separately spoken words at a time $t_{PE}$ for a last level signal having a logic level of "1" and followed by a predetermined number of level signals of logic level of "0";

determining a length of separately spoken words as a difference between the end time $t_{PE}$ and the beginning time $t_{PA}$;

dividing the separately spoken words into regions having an equal number of feature vectors so that each of said regions has $$\frac{2}{N_B + 1}$$

by the total number of vectors in each region, where $N_B$ is the number of regions and so that the beginning of each respective region is at a distance of:

$$0 \times \frac{1}{N_{B+1}}, 1 \times \frac{1}{N_B + 1}, 2 \times$$

-continued $$\frac{1}{N_B + 1} \ldots N_B - 1 \times \frac{1}{N_{B+1}}$$

from the beginning of said words;

averaging said feature vectors in each region to produce resulting vectors;

depositing said resulting vectors and said length and an appropriate code as an identifier in the lexicon during a learning phase for each word to be recognized;

eliminating lexicon words having lengths smaller by a factor of F1 and larger by a factor of F2 than said length of the word to be recognized in a recognition phase;

identifying the distance of the word to be recognized from remaining ones of said lexicon words by summation of the differences of said respective resulting vectors of the word to be recognized and the remaining lexicon words;

selecting as fitting one of said lexicon words having the least distance from the word to be recognized;

rejecting said selected lexicon word if said least distance is greater than a prescribed value;

outputting said appropriate code selected as an identifier for said fitting lexicon word; and triggering a predetermined action by said output coding.

15. A method as claimed in claim 14, further comprising the steps of:

processing a plurality of expressions for each word to be recognized, and storing said plurality of processed expressions in the lexicon.

16. A method as claimed in claim 15, wherein an expression from said plurality of expressions which has the least distance from others of said expressions of a word is stored for every word to be recognized.

17. A method as claimed in claim 14, including relearning a lexicon word by averaging the lexicon word length and said resulting vectors in case a least recognition distance falls below a prescribed value.

18. A method as claimed in claim 14 further comprising:

acquiring expressions of a word to be recognized from various speakers.

19. A method as claimed in claim 14, wherein the number of said regions is fixed at five.

20. A method as claimed in claim 14, wherein the step of calculating the resulting vectors includes using arithematic averaging.

* * * * *